(12) United States Patent
Nagai

(10) Patent No.: US 7,178,956 B2
(45) Date of Patent: Feb. 20, 2007

(54) INTERIOR ILLUMINATION LAMP

(75) Inventor: Kentaro Nagai, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/047,716

(22) Filed: Feb. 2, 2005

(65) Prior Publication Data
US 2005/0207158 A1    Sep. 22, 2005

(30) Foreign Application Priority Data
Mar. 19, 2004 (JP) .......................... P2004-080258

(51) Int. Cl.
*B60Q 1/00* (2006.01)
(52) U.S. Cl. ..................... 362/490; 362/488
(58) Field of Classification Search ............... 362/488, 362/490, 483, 489, 492
See application file for complete search history.

(56) References Cited

U.S. PATENT DOCUMENTS 5,944,414 A * 8/1999 Nishitani et al. ........... 362/490
6,513,959 B2 * 2/2003 Serizawa et al. ........... 362/490

FOREIGN PATENT DOCUMENTS

| DE | 195 06 651 C1 | 8/1996 |
| DE | 44 47 527 C2 | 1/1998 |
| DE | 198 48 820 A1 | 4/1999 |
| DE | 100 61 866 A1 | 7/2001 |
| DE | 102 47 344 A1 | 4/2003 |
| EP | 0 475 065 A1 | 3/1992 |
| JP | 2003-335191 A | 11/2003 |

* cited by examiner

*Primary Examiner*—Stephen F Husar
(74) *Attorney, Agent, or Firm*—Sughrue Mion, PLLC

(57) ABSTRACT

A design part 20 is attached to an aperture 12 provided in an interior material 11 of a automobile, and a functional part 30 is arranged at the rear side of the interior material 11 supported by the design part 20. A switching unit 32 feeding and cutting an electric power to a light source 31 is configured as a separate body attached to a functional main body 30a in such a manner that switch units 32 of different mechanisms can be selectively attached to the functional main body 30a. Thus, since the functional main body 30a is used in common even when the switching unit 32 is changed and has a general-purpose nature, cost reduction can be attained.

3 Claims, 9 Drawing Sheets

INTERIOR ILLUMINATION LAMP

BACKGROUND OF THE INVENTION

1. Field of the Invention

The present invention relates to an interior illumination lamp, for example, attachable to the inside of an automobile.

2. Related Art

Conventionally, there is provided an interior illumination lamp installed in the inside of an automobile as shown in FIG. 9, for example, Unexamined Japanese Patent Publication 2003-335191.

As shown in FIG. 9, this room illuminating light 100 has a function-concentrated unit 101 which is a functional part fitted in an aperture provided in the ceiling of the automobile, and a cover 102 of rectangle shape which is made of a synthetic resin and constitutes a design part capable of fitting in the interior material of the ceiling as a configuration integrated with this function-concentrated unit 101. The cover 102 has surrounding walls 102a to be fitted in the frame or inner panel of the automobile body, a flange 102b located in the indoor side adjacent to this surrounding walls 102a, and a light-transmitting lamp cover 102c in the inside of this flange 102b. And, at one end of the lamp cover 102c, a pushing type operating button 102d that operates to turn on or off a switch 101a to be described later on is arranged in a freely mobile manner in the vertical direction.

On the other hand, function-concentrated unit 101, which is to be electrically connected to a wire harness (W/H) arranged in the rear side of the interior material for the ceiling via a pressure contact connector 101b, comprises a switch 101a operating a bulb 103 on and off, a light-emitting bulb 103, and a reflecting board 104 that directs the light emitted from the bulb 103 towards the inside of the automobile through the lamp cover 102c.

Thus, the function-concentrated unit 101 is integrated with the cover by being electrically connected to a wire harness W/H arranged at the rear side of the interior material by means of a pressure contact connector 101b and fitted in the inside of the surrounding walls 102a. Since, in this integrated structure, an operating button 102d provided in the cover 102 is positioned right above (interior side) the push button 101c of the switch 101a in the function-concentrated unit 101, the switch 101a can be switched by pushing operating button 102d.

Meanwhile, in the function-concentrated unit 101 of the aforementioned room illuminating light 100, the switch 101a is configured integrally with another function-concentrated unit 101, i.e., the pressure contact connector 101b and reflection board 104. For that reason, in the case where a switch of a different shape (for example, push-lock type, sliding switching type, alternate-lock type, etc.) is adopted or exchanged, the entire function-concentrated unit 101 had to be newly produced in conformity with the shape of the switch and install the switch therein, which was not only troublesome, but also unfavorably uneconomical.

SUMMARY OF THE INVENTION

In view of the forgoing problem, the present invention has been devised to solve the above-cited problems, and an object of the present invention provides a general-purpose room illuminating light capable of selectively adopting and installing switches of different shapes.

To solve the above-cited problems, the interior illumination lamp associated with the invention comprises a design part having a lens fixed to a housing that is attachable to an aperture arranged in an interior material of a automobile, a functional part which is arranged at the rear side of the interior material by being supported with the design part and which is provided with a light source whereby a switching unit, which feeds and cuts an electric power to the light source is provided in the functional main body of the functional part, and is provided such that the switching unit and the functional main body are separately configured, and that plural kinds of switching units each differing in the on/off mechanism for the electric power are selectively attachable to the functional main body.

In the interior illumination lamp configured in such a manner, the design part is attached to the aperture arranged in an interior material of an automobile, and the functional part, provided with a light source, is attached to the rear side of the interior material by being supported by the design part. The switching unit feeding and cutting an electric power to the light source is attached to the functional main body as a separately configured unit, and thus a plurality of switching units each differing in the on/off mechanism can be selectively attached. For that reason, even if the switching unit is changed, the functional unit can be used in common and has a general-purpose nature, thus leading to cost reduction.

Further, the interior illumination lamp associated with the invention is provided such that the functional main body comprises an accommodation unit capable of accommodating the switching unit, guiding means that guides the switching unit into the accommodation unit and fixes the switching unit at a predetermined place, and connecting means capable of electrically connecting the switching unit to the functional part when the switching unit is fixed at the predetermined place.

In an interior illumination lamp thus configured, at the attachment operation of the switching unit to the accommodation unit of the functional main body, the switching unit is positioned at a predetermined place in the accommodation unit according to the guiding means and fixed there. In addition, since the switching unit is electrically connected to the main body by means of the connecting means by accommodating the switching unit in the accommodation unit of the functional main body, the switching unit can be easily attached to the functional main body.

According to the invention, the problem accompanied by a conventional room illuminating light, in which a switching unit and a functional part are integrally configured, that for a different switching unit the functional part has to be newly produced in conformity with the shape of the switch can be solved, since the functional unit can be used in common for different switching units, thus leading to cost reduction.

DETAILED DESCRIPTION OF THE PREFERRED EMBODIMENTS

In the following, some embodiments associated with the invention are described in detail based on drawings.

Figure 1:
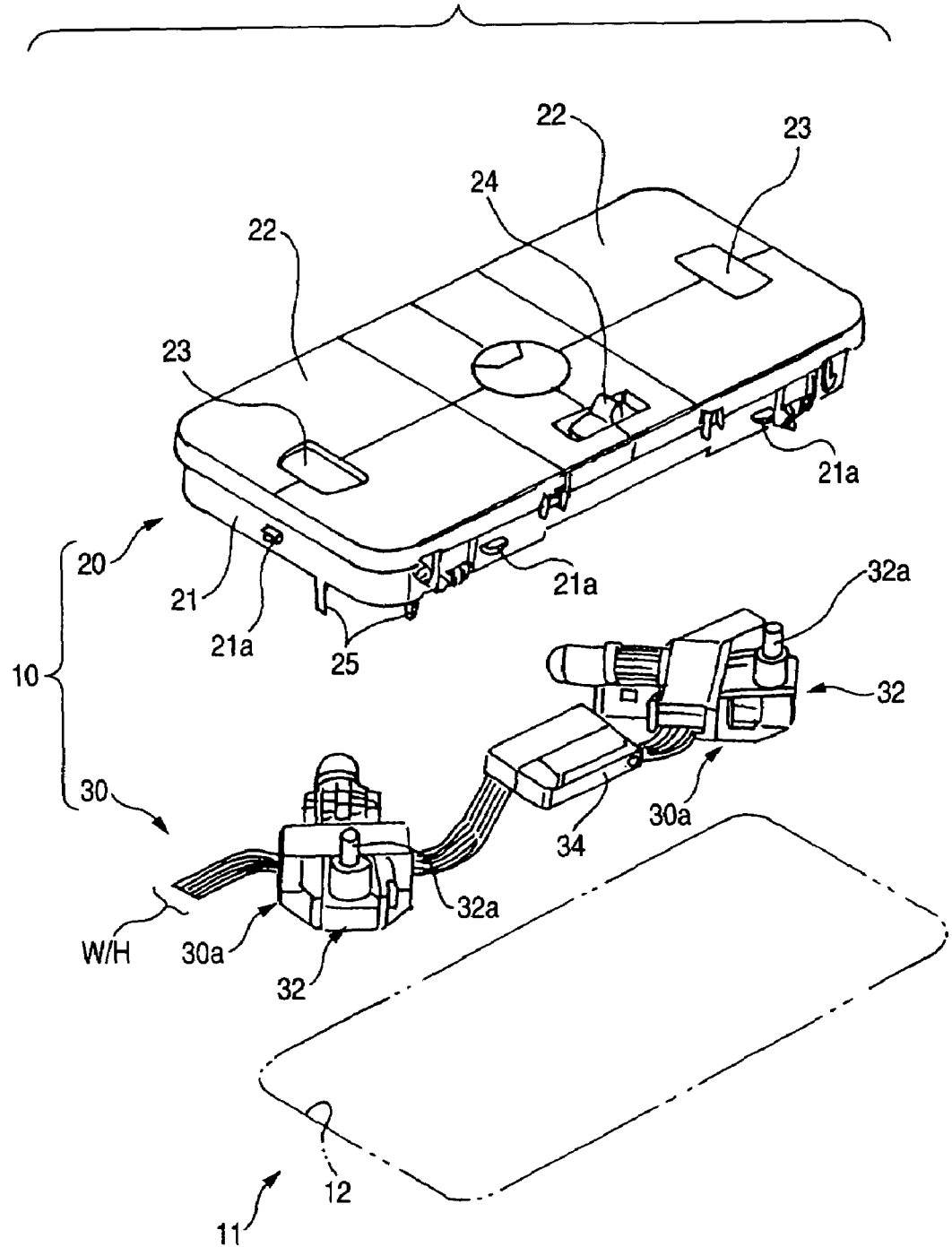
FIG. 1 is a decomposed bird-eye view showing an embodiment of an interior illumination lamp of the invention viewed from the room side.
Figure 2:
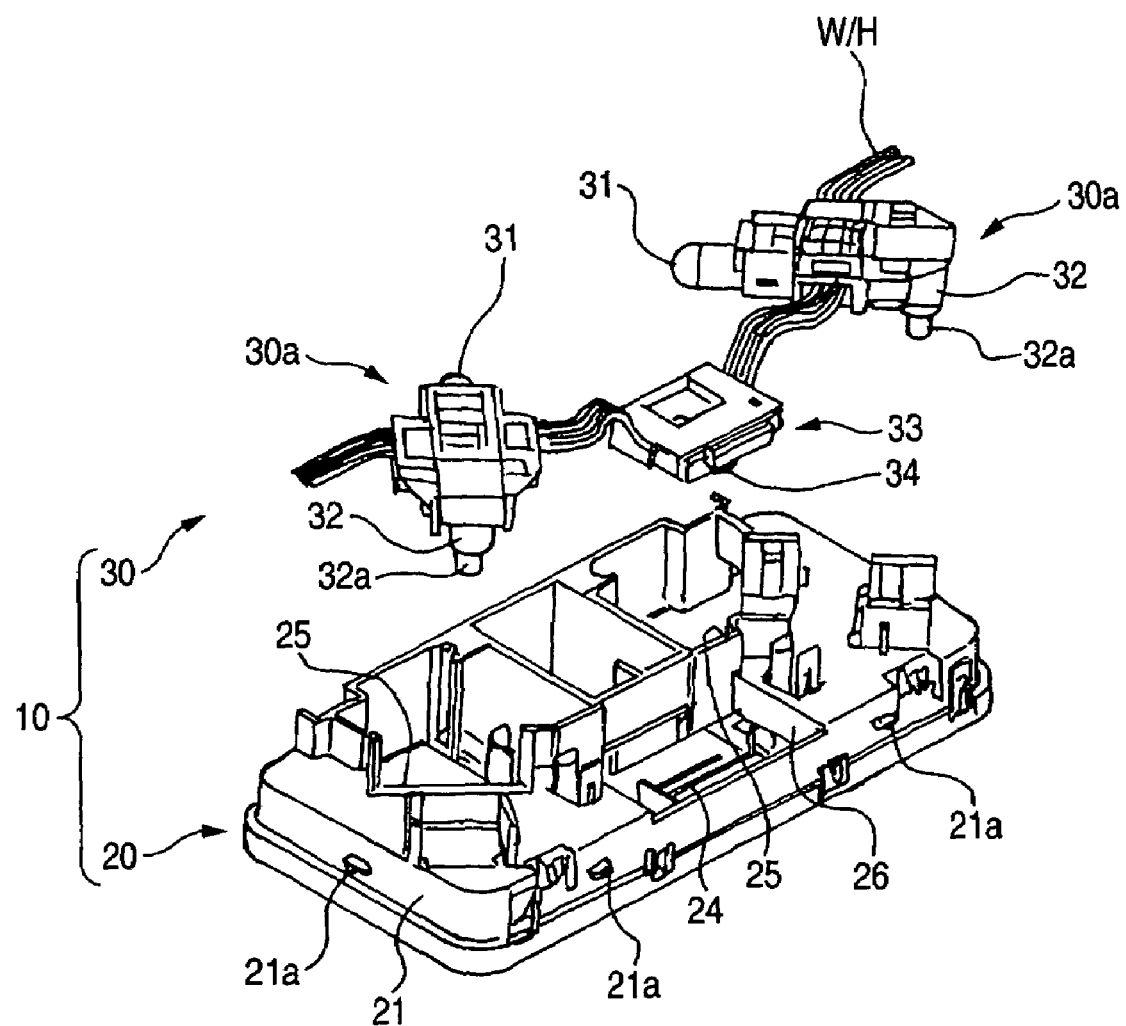
FIG. 2 is a decomposed bird-eye view of the interior illumination lamp in FIG. 1 viewed from the rear side.
Figure 3:
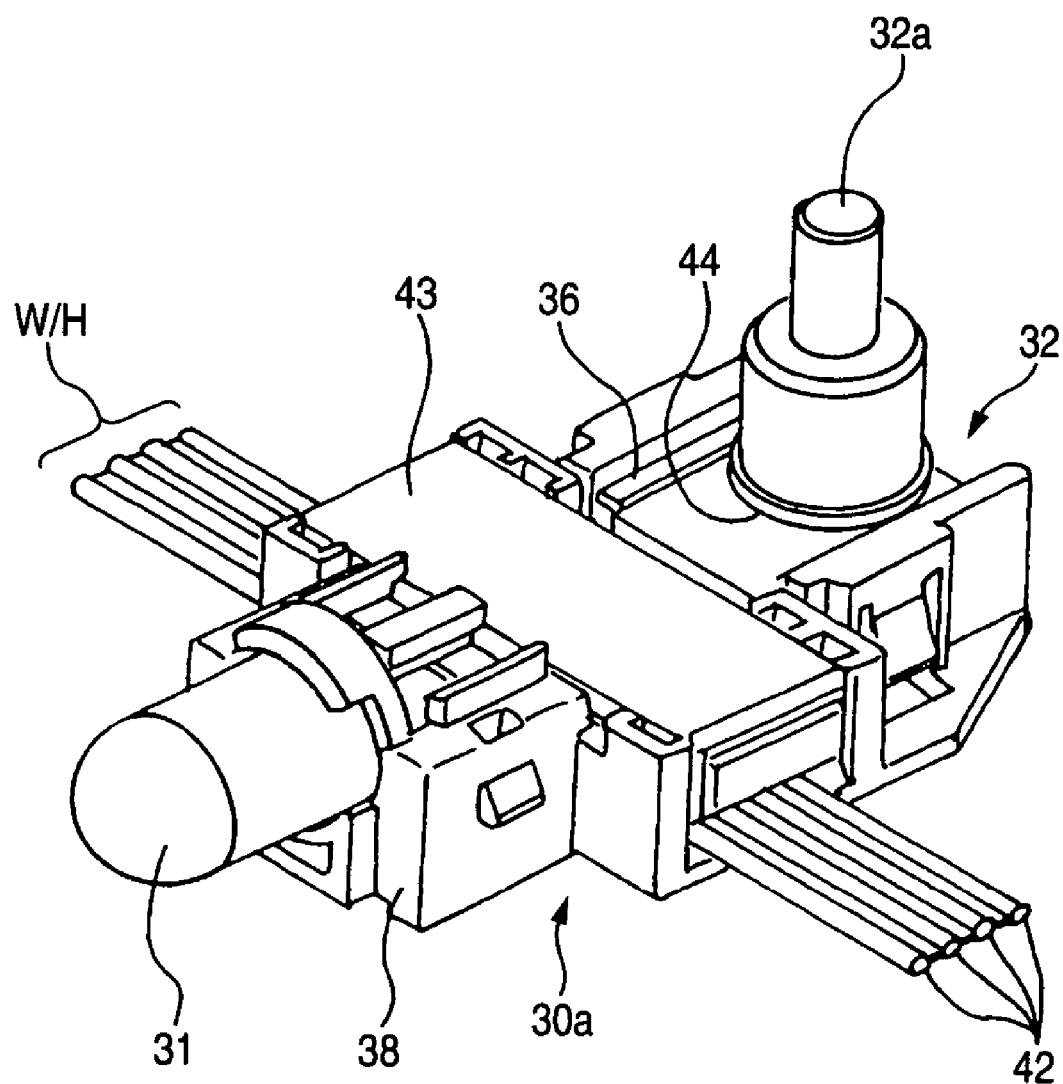
FIG. 3 is a bird-eye view of a functional main body.

As shown in FIGS. 1 and 2, room illuminating light 10 as an embodiment of the invention comprises a design part having a lens fixed to a housing 21 that is attachable to an aperture 12 arranged in an interior material 11 of a automobile, a functional part 30 which is arranged at the rear side of the interior material 11 by being supported with the design part 20, and which is provided with a bulb 31 as a light source. Moreover, a switching unit 32 feeding and cutting an electric power to the bulb 31 is provided in the functional main body 30a of the functional part 30.

Lenses 22 in the design part 20 are made of a transparent or semi-transparent resin, and at the end of each lens 22 is provided a switch button 23 in a vertically movable manner. Accordingly, when a person in the automobile pushes the switch button 23, the switching unit 32 of the functional part 30 can be turned on or off.

Meanwhile, in the interior illumination lamp shown in FIGS. 1 and 2, a pair of lenses 22 are arranged, for example, for the left and right seats. Between the two lenses 22 and 22, a knob for a sliding switch 24 is provided in a freely slidable manner, and a knob 34 for a mode-changing sliding switch 33 which is provided in the functional part 30 for the purpose of changing the mode of the interior illumination lamp 10 can be operated.

The housing 21, which is a wall-like member to attach the interior illumination lamp 10 to interior material 11, is arranged all around the interior illumination lamp 10 of rectangular shaped. And, at the outer plane thereof, hanging protrusions 21a for the prevention of falling off from the interior material 11 are appropriately arranged. As shown in FIG. 2, inside the housing 21, functional part-fitting walls 25 and 25 to fit in the functional part 30 to be described later are provided corresponding to the left and right lenses 22 and 22. Between both of the functional part-fitting walls 25 and 25, a sliding switch-fitting wall 26 is provided to fit the sliding switch 33n. The height of the functional part-fitting wall 25 is so determined as to be able to well accommodate the functional part 30 therein in order to ensure a space sufficiently wide not to bump the functional part 30 against the roof panel with too much inertia in the operation of attaching the interior illumination lamp 10 by pushing it into the aperture 12 of the interior material 11.

In the functional part 30, left and right functional main bodies 30a and 30a are arranged each having a bulb 31 that is a light source corresponding to the left or right lens 22. And in each functional main body 30a, a push-button type switch unit 32 is provided in such a manner as being attached or removed at will. Both functional main bodies 30a and 30a and the sliding switch 33 for mode changing are connected to a wire harness (W/H) for electric power supply. Each functional main body 30a or 30a is so configured that, when the main body is fitted in the left or right functional part-fitting wall 25 or 25 in each design part 20, the bulb 31 is positioned at the place corresponding to the lens 22 along with the knob 32a of the switching unit 32 being positioned at the place of the switch button 23 of the design part 20.

In addition, by fitting the sliding switch 33 in the sliding switch-fitting wall 26, the knob 34 of the sliding switch 33 becomes slidable integrally with a knob 24 for the sliding switch. Accordingly, a person in the automobile can change the lighting mode by sliding the knob 34 of the sliding switch 33 in the functional part 30 as a result of sliding the sliding switch knob 34 exposed in the room; i.e., for example, one can select the mode of the bulb 31 being turned on or off in conjunction with the opening or closing of a door, the always-on mode, or always-off mode.

In FIGS. 3 to 6, each functional main body 30a is illustrated. As shown in the drawings, each functional main body 30a comprises an accommodation unit 35 capable of accommodating the switching unit 32, guide rails 36 as guiding means for guiding the switching unit 32 into the accommodation unit 35 and for fixing the switching unit at a predetermined place, and a male tab 37 for switch connection as means for electrically connecting the switching unit 32 to the functional part 30 when the switching unit 32 is fixed at the predetermined place.

Namely, the functional main body 30a has a socket 38 in one side thereof, and a bulb 31 is attached to this socket 38 in a freely exchangeable manner. Thus, the bulb 31 can be easily exchanged in the case of burning out.

Further, an allocating path 39 traversing the central portion of the functional main body 30a is arranged. Inside this allocating path 30, a plurality of pressure contact blades 41 are installed. Accordingly, by arranging a wire harness W/H comprising plural electric wires 42 (in FIGS. 3 and 4, four wires) along the allocating path 39 and by appropriately pushing each electric wire 42 to the pressure contact blade 41, an electric power can be fed by electrically connecting the wire harness W/H to the functional main body 30a. Meanwhile, a strain-relief cover 43 is placed on the connected wire harness W/H from above to prevent each electric wire 42 from being detached from the pressure contact blade 41 when a tension acts on the wire harness W/H.

Figure 5:
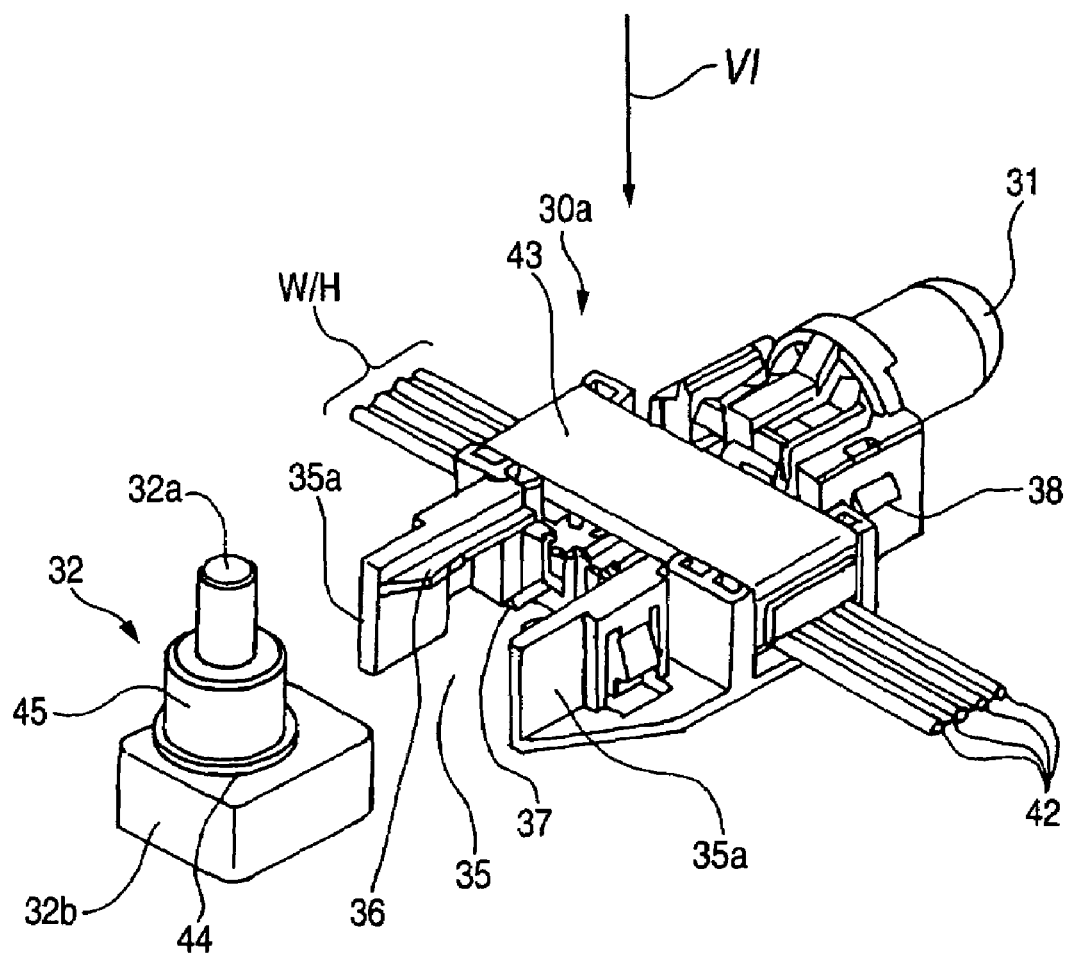
FIG. 5 is a bird-eye view showing a functional main body and a switching unit.
Figure 6:
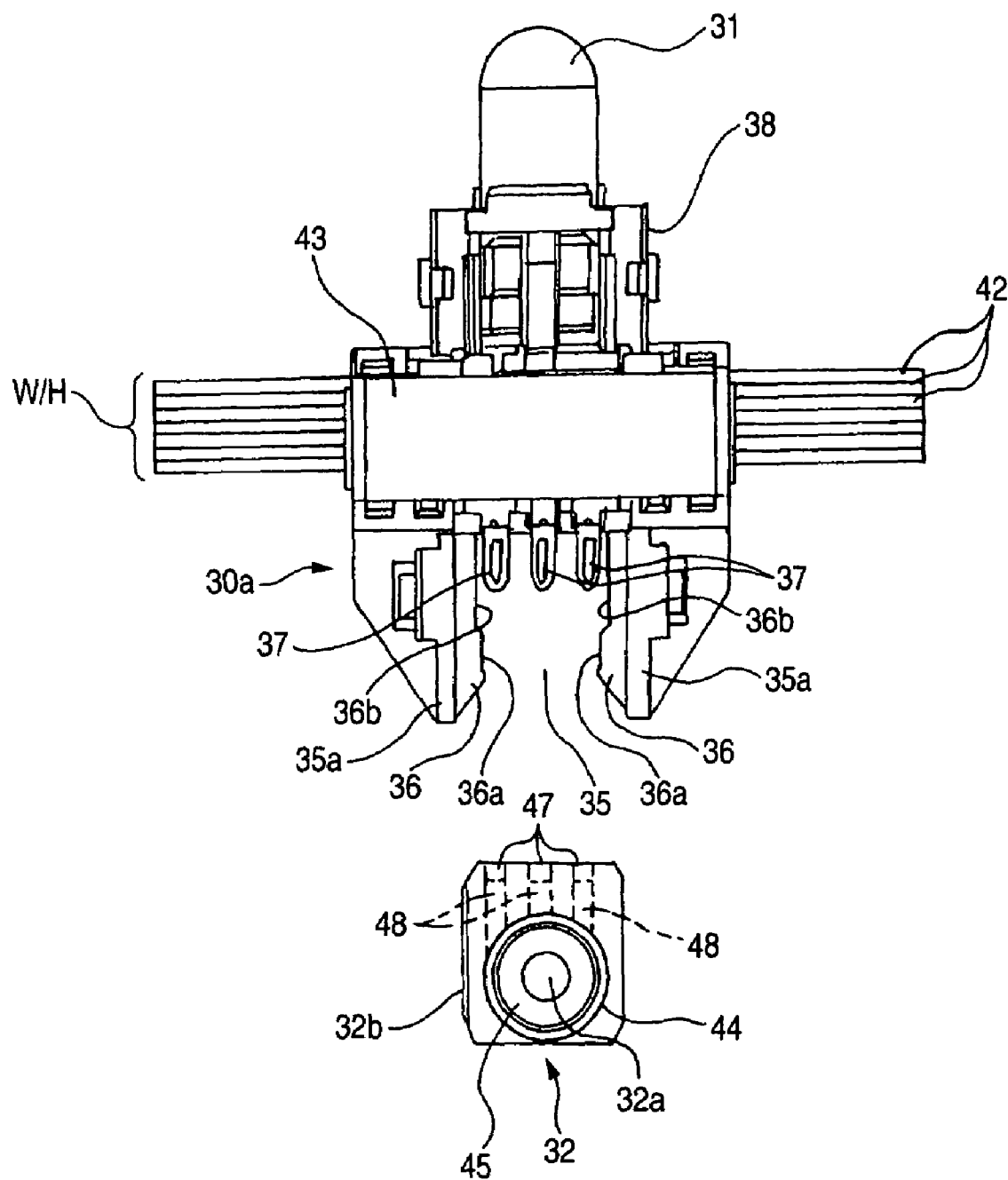
FIG. 6 is a plan view viewed from the VI direction in FIG. 5.

As shown in FIGS. 5 and 6, the functional main body 30a has the accommodation unit 35 at the other side (the side opposite to the bulb 31) thereof, and is configured so that the switch unit 32 is installed in a freely exchangeable manner. On the side walls 35a lying in both sides of the accommodation unit 35, a pair of guide rails 36 and 36 are provided along the inserting direction of the switching unit 32.

On the other hand, on the top plane of the main body 32b of the switching unit 32, a guided unit 44 is provided which is guided by the guide rails 36 as guiding means equipped in the functional main body 30a. On this guided unit 44, a knob-guiding unit 45 is provided which actuates the switch knob 32a so as to be vertically movable and, at the same time, consistently pushed upwards. This guided unit 44 has a disk-shaped flange 44a and a guide groove 44b formed between this flange 44a and the top plane of the main body of the switch unit 32b, whereby the guide rail fits in and is supported by the guide groove 44b in a freely movable manner.

Figure 7:
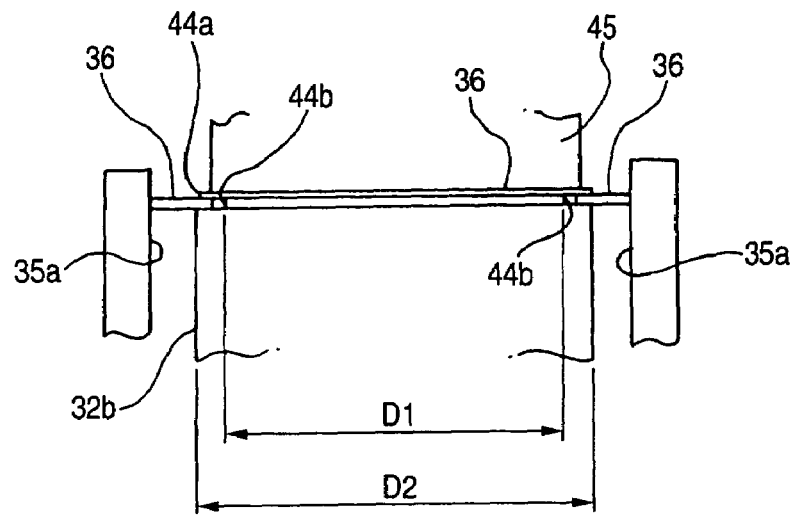
FIG. 7(A) is a front view showing the dimensions of the guide rails of the accommodation unit and the guide groove of the switching unit.
FIG. 7(B) is a plan view showing the dimensions of the guide rails of the accommodation unit and the guide groove of the switching unit.
Figure 7:
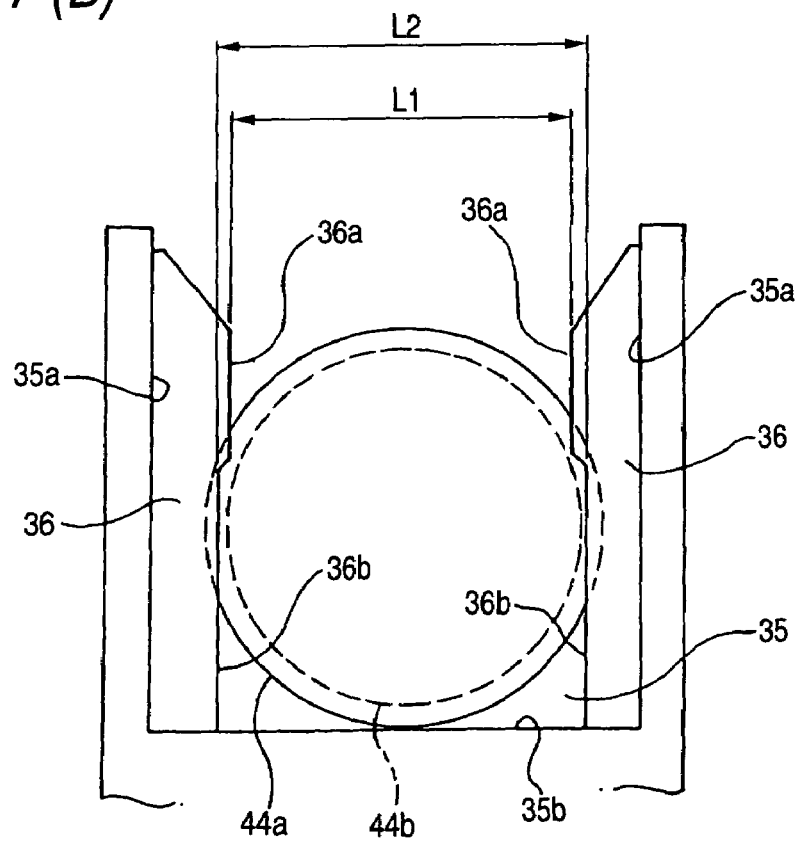

As shown in FIGS. 6 and 7, each guide rail 36 has a large width portion 36a at its tip part (entrance side), and the spacing L1 between the tip parts of both large width portions 36a and 36a is slightly narrower than the outer diameter D1 of the guide groove 44b of the switch unit 32 (L1<D1). A small width portion 36b is provided at the inner side of the large width portion 36a, and the spacing L2 between the tip parts of both small width portions 36b and 36b is slightly narrower than the outer diameter D1 of the guide groove 44b (D1<L2<D2). Further, under the condition of the outer periphery of the flange 44a being in contact with the inner wall 35b of the accommodation unit 35, the guide groove 44b is configured so as to be accommodated without contacting the large width portion 36b of the guide rails 36 and positioned and fixed at this place.

Figure 4:
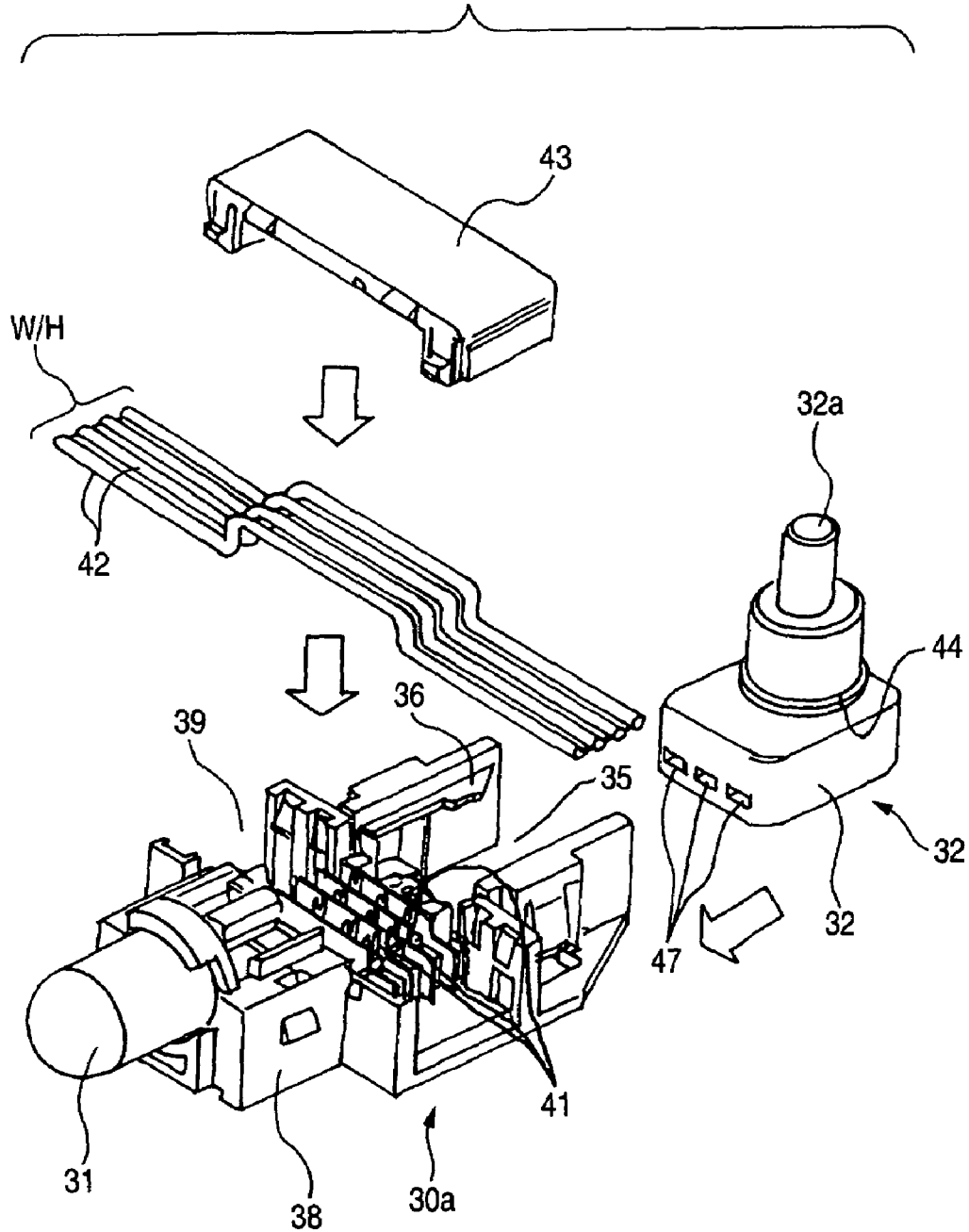
FIG. 4 is a decomposed bird-eye view of a functional main body.

As shown in FIGS. 5 and 6, plural, thin board-shaped male tabs 37 are provided that horizontally protrude from the inner wall 35b of the accommodation unit 35. In the functional main body 30a, there are equipped the male tabs 37 and a bus bar (not shown in the drawing) the other end of which appropriately connects the pressure contact blade 41 in the allocation path 39 with the socket 38 of the bulb 31. On the other hand, as shown in FIGS. 4 and 6, on the front plane of the main body 32b of the switch unit 32, there are equipped male tab insert holes 47 in which the male tabs 37 are inserted, and inside the holes are provided female terminals 48.

When the switch unit 32 is accommodated in the accommodation unit 35, the guide groove 44b advances towards the accommodation unit 35 slightly expanding the large width portion 36a of the guide rails 36, and when the guide groove 44 passes the large width portion 36a, the flange 44a of the switch unit 32 contacts with the inner wall 35b of the accommodation unit 35. Then simultaneously, the male tabs 37 of the functional main body 30a are inserted into the male tab insert hole 47 of the switch unit 32 whereby the male tabs 37 are electrically connected to the female terminal 48. In addition, since, in this condition, the guide rails 36 is vertically sandwiched between the flange 44a and the top plane of the main body 32b of the switch unit 32, the switch unit 32 is held in the accommodation unit 35.

Thus, the electric power fed from the wire harness W/H passes the bus bar and the male tab 48 from the pressure contact blade 41 on one hand. And, then from the female terminal 48, the power is fed to the switch unit 32. Further, in the case where the switch unit 32 is 'on', the power is fed from the female terminal 48 of the switch unit 32 via the male tab 37 and the bus bar to the socket 38. Finally, the power is fed to the bulb 31. In addition, since, on the other hand, the power is fed from the wire harness W/H via the pressure contact blade 41 and the bus bar and directly to the switch unit 32, the bulb 31 turns on. By way of precaution, in the case where the switch unit 32 is 'off', the current is fed to the bulb 31 only from one side, resulting in the bulb 31 turned off.

According to the interior illumination lamp 10 described heretofore, the switching unit 32 feeding and cutting an electric power to the bulb 31 is provided as a separate body from the functional main body 30a, and can selectively attach switching units of different mechanisms. For that reason, even if the switch unit 32 is changed, the functional main body 30a can be used in common, provided with a general-purpose nature. Thus, compared with the conventional room illuminating light in which the switch unit is integrally configured with the functional part, cost reduction can be attained for the interior illumination lamp 10.

The interior illumination lamp of the invention is not limited to the above-described embodiment, but appropriate modifications or improvements are possible.

Figure 8:
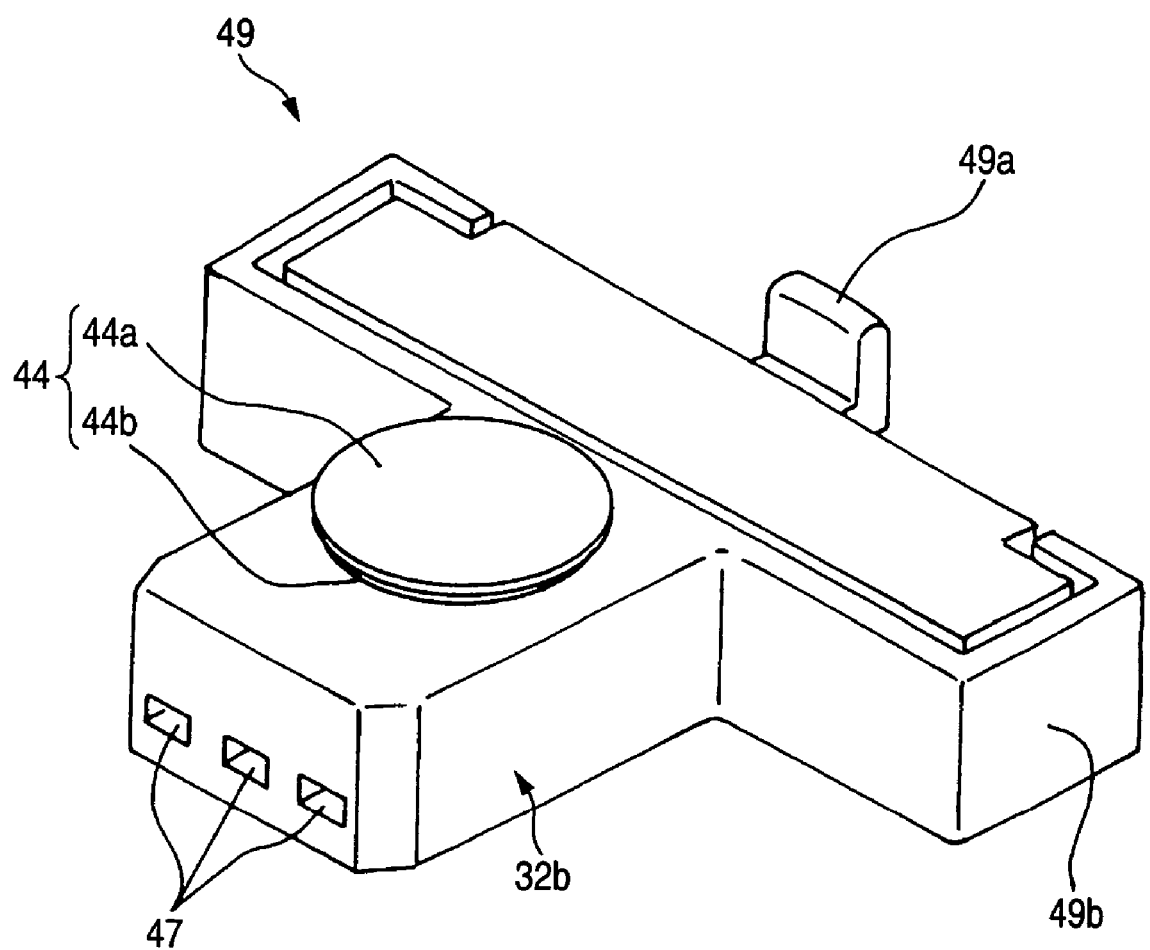
FIG. 8 is a bird-eye view showing a slide type switch as an example of the switching unit having a different function.
Figure 9:
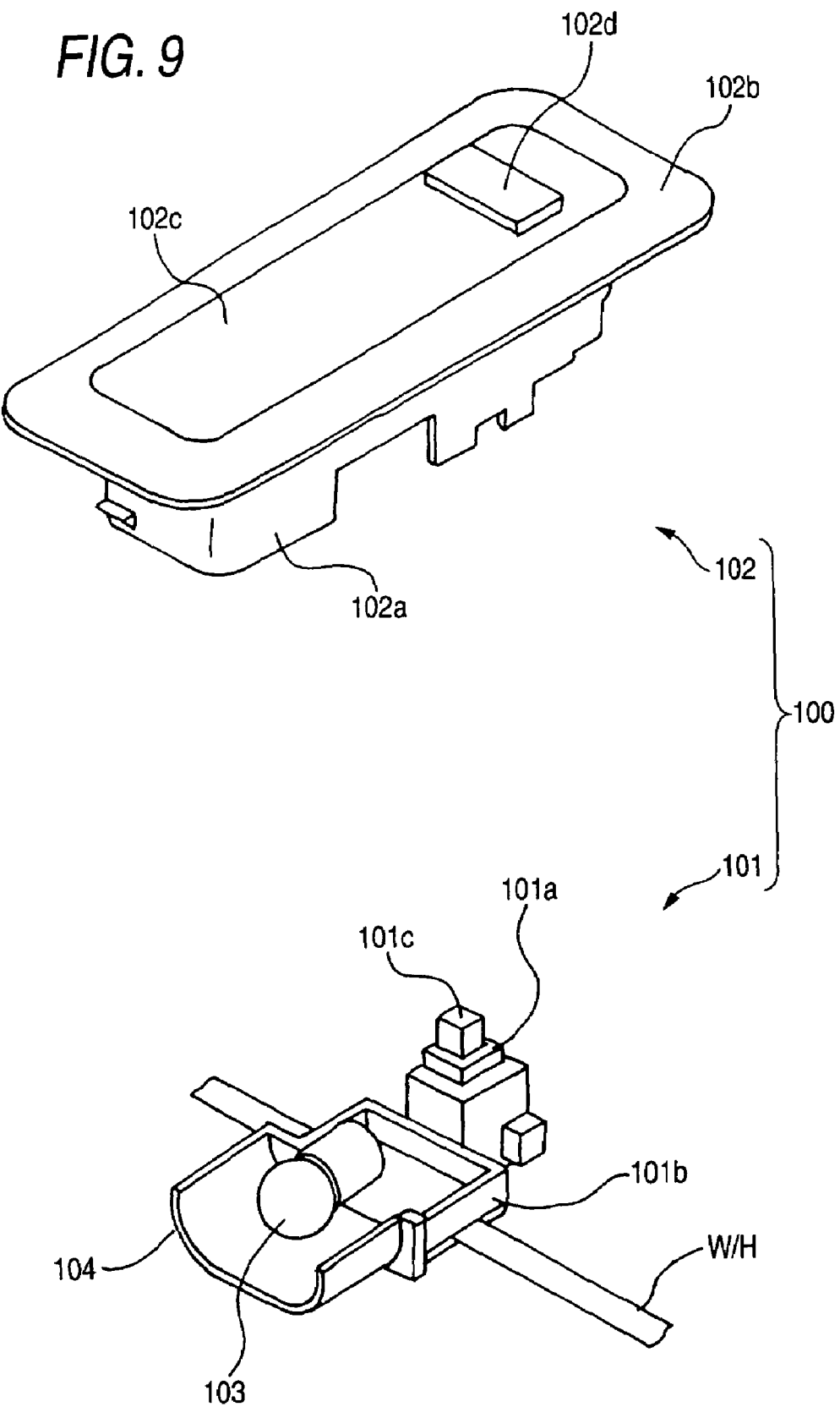
FIG. 9 is a decomposed bird-eye view showing a conventional room illuminating light.

For example, in the above-described embodiment, a push-button type switch was exemplified for the switch unit 32 as shown in FIGS. 2 to 6. But, the scope of the invention is not limited to this type; for example, the push-button type may be exchanged to a slide type switch unit 49 as shown in FIG. 8. Meanwhile, the switch units that are exchangeable must at least have the main body 32b of the switch unit of the same size and shape and be able to be accommodated in the accommodating unit 35, and further have male tab-inserting holes 47 at the same place and the female terminals 48 inside the holes. Meanwhile, in the slide-type switch unit 49, a knob guiding unit 49b, which supports the switch knob 49a in a freely slidable manner, is equipped at the side of the main body 32b of the switch unit 32, not on the guided unit 44.

In addition, as shown in FIGS. 1 and 2, in the aforementioned embodiment, explanation was given for the case where the functional part 30 has two functional main bodies 30a. However, the concept of the invention can also be applied similarly to the cases of one, three or more of functional main bodies.

What is claimed is:

1. An interior illumination lamp comprising:
   a design part having a lens fixed to a housing attachable to an aperture provided in an interior material of a automobile;
   a functional part including a functional main body having a light source connected thereto, said functional main body being supported by the design part at the rear side of the interior material; and
   a switching unit alternatively feeding and cutting electric power to the light source, and provided in the functional main body of the functional part, the switching unit being removably provided on the functional main body.

2. The interior illumination lamp set forth in claim 1, wherein the functional main body includes:
   an accommodation unit capable of accommodating the switching unit;
   a guiding member guiding the switching unit into the accommodation unit and fixing the switching unit at a predetermined place; and
   a connecting member capable of electrically connecting the switching unit to the functional unit when the switching unit is fixed at the predetermined place.

3. The interior illumination lamp set forth in claim 1, wherein plural kinds of switching member each differing in the on/off mechanism for the electric power are selectively attachable to the functional main body.

* * * * *